(12) United States Patent
Ramesh et al.

(10) Patent No.: US 9,479,044 B1
(45) Date of Patent: Oct. 25, 2016

(54) INTERMITTENT POWER LINE COMMUNICATION FOR INVERTERS

(71) Applicant: Google Inc., Mountain View, CA (US)

(72) Inventors: Anand Ramesh, Sunnyvale, CA (US); Subhrajit Roychowdhury, San Jose, CA (US)

(73) Assignee: Google Inc., Mountain View, CA (US)

( * ) Notice: Subject to any disclaimer, the term of this patent is extended or adjusted under 35 U.S.C. 154(b) by 39 days.

(21) Appl. No.: 14/585,994

(22) Filed: Dec. 30, 2014

(51) Int. Cl.
*H02M 1/12* (2006.01)
*H02M 1/32* (2007.01)
*G08C 19/00* (2006.01)
*G05F 1/70* (2006.01)

(52) U.S. Cl.
CPC .............. *H02M 1/12* (2013.01); *G05F 1/70* (2013.01); *G08C 19/00* (2013.01); *H02M 1/32* (2013.01); *H02M 1/126* (2013.01)

(58) Field of Classification Search
CPC ........ H02M 1/32; H02M 5/27; H02M 5/451; H02M 5/4585; H02M 5/458; H02M 7/5387; H02M 7/539; H02M 7/53803; H02M 7/53871; H02M 1/126; H02M 1/12; H04B 3/54; H04B 7/12; H04B 3/542; H02J 3/36; G08C 19/00
USPC ........... 340/12.32, 310; 363/40, 37, 43, 131, 363/35, 98, 32
See application file for complete search history.

(56) References Cited

U.S. PATENT DOCUMENTS 3,924,223 A 12/1975 Whyte et al.
5,345,601 A 9/1994 Takagi et al.
5,717,585 A * 2/1998 Nguyen ............ H02M 7/53803 363/132
2002/0130768 A1 9/2002 Che et al.
2015/0078463 A1* 3/2015 Fornage .................. H04B 3/54 375/257
2015/0171735 A1* 6/2015 Kapinski ................ H02M 5/27 363/40

FOREIGN PATENT DOCUMENTS

EP 2041884 2/2011

OTHER PUBLICATIONS

Coakley and Kavanagh, "Real-Time Control of a Servosystem Using the Inverter-Fed Power Lines to Communicate Sensor Feedback," IEEE Transaction on Industrial Electronics, 46(2):360-369, Apr. 1999.
Guerrero et al., "Decentralized Control for Parallel Operation of Distributed Generation Inverters Using Resistive Output Impedance," IEEE Transactions on Industrial Electronics, 54(2):994-1004, Apr. 2007.

* cited by examiner

*Primary Examiner* — Ali Neyzari
(74) *Attorney, Agent, or Firm* — Fish & Richardson P.C.

(57) ABSTRACT

Methods, systems, and apparatus, including computer program products for structured content ranking. In an aspect, a method includes, receiving, at a controller, an alternating current signal; determining harmonic values that describe a fundamental frequency component of the alternating current signal and harmonic components of the alternating current signal; accessing, by the controller, control data that defines a relation of harmonic values to operational instructions, wherein each operational instruction, when supplied to an inverter, causes the inverter to perform an operation defined by the operational instruction; selecting, by the controller, an operational instruction from the operational instructions, the selected operational instruction based on the harmonic values and the control data; and providing, by the controller, the selected operational instruction to the inverter to cause the inverter to perform the operation defined by the selected operational instruction.

20 Claims, 4 Drawing Sheets

INTERMITTENT POWER LINE COMMUNICATION FOR INVERTERS

BACKGROUND

This specification relates to intermittent power line communication, and in particular power line communication for power inverters.

In some applications, parallel power inverters operate according to executable firmware instructions or system conditions, which generally limit or preclude various desired dynamic inverter operations. In other applications, in addition to a controller, external communication hardware can be coupled to the parallel inverters such that operating commands may be sent to the parallel inverters while they are in operation.

SUMMARY

This specification relates to communicating with parallel inverters through power lines and communication signals received by the inverters. In general, one aspect of the subject matter described in this specification can be embodied in methods that include the actions of receiving, at a controller, an alternating current signal; determining harmonic values that describe a fundamental frequency component of the alternating current signal and harmonic components of the alternating current signal; accessing, by the controller, control data that defines a relation of harmonic values to operational instructions, wherein each operational instruction, when supplied to an inverter, causes the inverter to perform an operation defined by the operational instruction; selecting, by the controller, an operational instruction from the operational instructions, the selected operational instruction based on the harmonic values and the control data; and providing, by the controller, the selected operational instruction to the inverter to cause the inverter to perform the operation defined by the selected operational instruction. Other embodiments of this aspect include corresponding systems, apparatus, and computer program products.

Another aspect of the subject matter described in this specification can be embodied in methods that include the actions of determining, by a main controller, an operational instruction for an inverter, wherein the operational instruction, when supplied to the inverter, causes the inverter to perform an operation chosen from at least one of a plurality of inverter functional operations; determining, by the main controller, harmonic values that describe a fundamental frequency component of an alternating current signal and harmonic components of the alternating current signal; accessing, by the main controller, control data that defines a relation of the harmonic values and harmonic components of the alternating current signal to the determined operational instruction; injecting, by the main controller, the control data into the alternating current signal that corresponds to the determined operational instruction for the inverter, wherein the control data comprises harmonic values selected to define the operational instruction for the inverter; and transmitting, by the main controller, the alternating current signal with the injected control data to the inverter causing the inverter to perform, based on the injected control data, at least one of the plurality of inverter functional operations. Other embodiments of this aspect include corresponding systems, apparatus, and computer program products.

Another aspect of the subject matter described in this specification can be embodied in systems that include the actions of an inverter, a main controller, and an inverter controller coupled to the inverter and the main controller, the inverter controller operatively configured to perform operations comprising: receive an alternating current signal; determine harmonic values that describe a fundamental frequency component of the alternating current signal and harmonic components of the alternating current signal; access control data that defines a relation of harmonic values to operational instructions, wherein each operational instruction, when supplied to an inverter, causes the inverter to perform an operation defined by the operational instruction; select an operational instruction from the operational instructions, the selected operational instruction based on the harmonic values and the control data; and provide the selected operational instruction to the inverter to cause the inverter to perform the operation defined by the selected operational instruction. Other embodiments of this aspect include corresponding systems, apparatus, and computer program products.

Particular embodiments of the subject matter described in this specification can be implemented to realize one or more of the following advantages. A controller for an inverter or parallel inverters can dynamically alter the operation of the inverter while the inverter is under no load or under load. Particular implementations of the subject matter enable a controller to communicate intermittently with the parallel inverters without the use of external communication hardware, which offers a cost-effective and efficient solution of offering additional dynamic inverter control. Particular implementations enable communication via a microprocessor and existing firmware without complicating existing hardware setups.

Some communication methods can utilizes relatively low frequencies that provide very low noise levels such that additional filtering is not required for the inverters. In some implementations, the communication between different components may be characterized as a binary representation that enables low-bandwidth communication within the system.

Further, some implementations enable communication between the inverter and the electrical load, between a central coordinating authority within the network, and/or other points of power generation and distribution that are not located on a power grid.

The advantages and features listed in the above list are optional and not exhaustive. The advantages and features can be separately realized or realized in various combinations.

The details of one or more embodiments of the subject matter described in this specification are set forth in the accompanying drawings and the description below. Other features, aspects, and advantages of the subject matter will become apparent from the description, the drawings, and the claims

BRIEF DESCRIPTION OF THE DRAWINGS

Like reference numbers and designations in the various drawings indicate like elements.

DETAILED DESCRIPTION

The systems and methods described below facilitate providing a selected operational instruction to an inverter coupled to an alternating current (AC) load and a direct current (DC) power supply. In some implementations, the present systems and methods utilize a power signal to transmit the operational instruction from a main controller to the inverter or a group of parallel inverters. The operational instruction can enable dynamic operational control of the inverter regardless of the inverter state (e.g., in operation, in standby mode, off, etc.).

In some implementations, transmitting operational instructions utilizing inserted or extracted harmonic values within a power signal enables communication between a main controller and an inverter without the use of external communication hardware. Further, this communication mechanism can be used with a parallel inverter network.

These features and additional features are described in more detail below.

Figure 1:
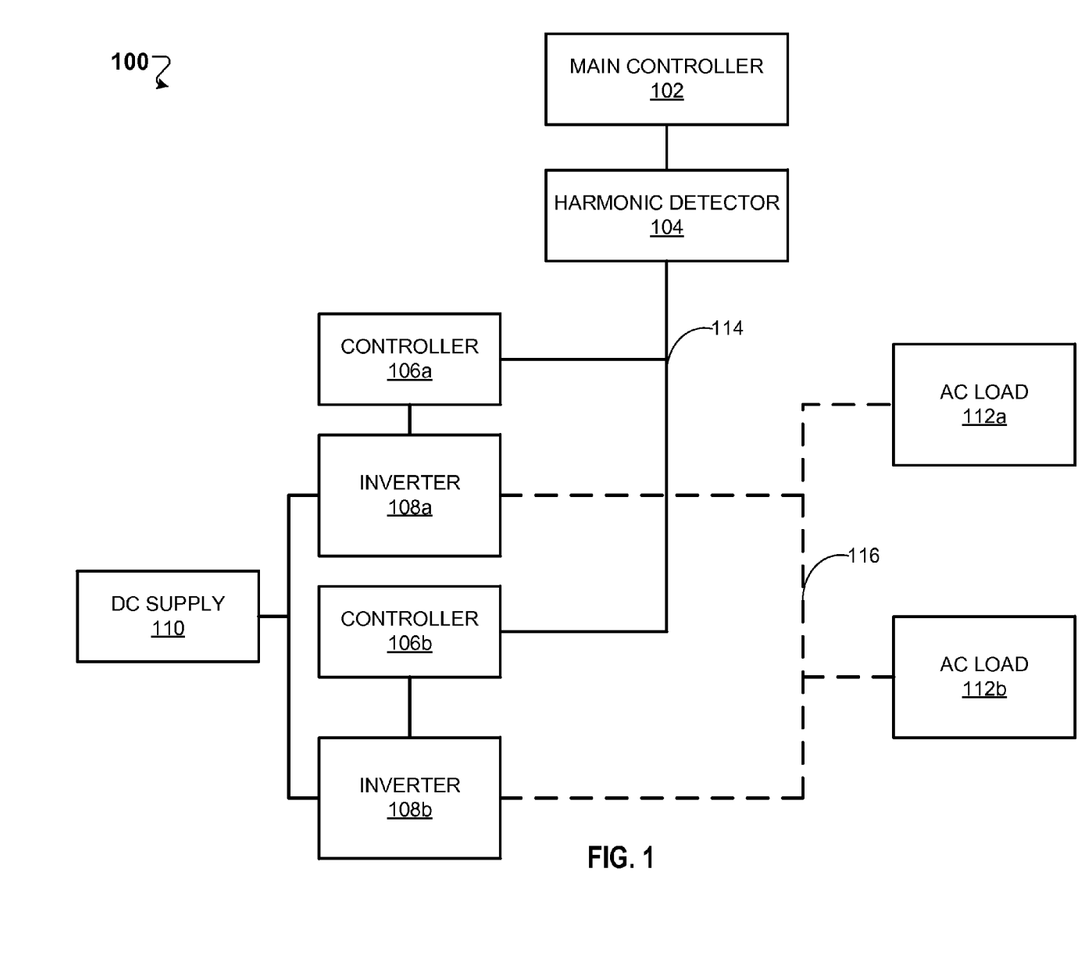
FIG. 1 is a block diagram of an example system in which a main controller transmits operational instructions to parallel inverters.

FIG. 1 is a block diagram of an example system 100 in which a main controller 102 transmits operational instructions to a network of parallel inverters. The example system 100 can include a DC power supply 110 coupled to parallel inverters 108a, 108b, which are coupled to a supply bus 116 in the example system 100. Further, parallel AC loads 112a, 112b can be coupled to the supply bus 116 and receive AC power from the parallel inverters. The parallel inverters 112a, 112b can supply power to one or more AC loads 112a, 112b depending on the design of the example system 100.

The AC power that is supplied by the inverters 108a, 108b can be, e.g., single phase or three phase signals. In addition, the AC voltage supplied by the inverters can include 120 VAC, 240 VAC, 13KVAC, 115KVAC, or any desired voltage. The DC power supply 110 can include batteries, fuel cells, photovoltaic panels, wind power, or any other appropriate DC power source. The DC voltage can include 12 V DC, 24 V DC, 48 V DC, 200 to 400 V DC, 300 to 450 V DC, or any suitable voltage. Further, the current/voltage waveform of the AC power can include a sine wave, a square wave, or any other desired AC wave form.

The inverter 108a, 108b receives DC power from the DC power supply 110 and converts the DC power to AC power. The AC power is transmitted via the supply bus 116 to the AC load 112a, 112b. The AC load 112a, 112b can include any suitable AC load requiring AC power. For example, the AC load may include emergency AC motors used for critical power systems during an emergency shut down or start up.

In some implementations, the main controller 102 is coupled to a harmonic detector 104 and subsequently to a power bus 114 that is also coupled to inverter controllers 106a, 116b that are independently coupled to the inverters 108a, 108b. The harmonic detector 104 can include a standalone unit or it can be integrated with one or more of the inverter controllers 106a, 106b. Likewise, an inverter controller may be a unit external to one of the inverters 108a, 108b, or an inverter controller may be integrated into one of the inverters 108a, 108b. Further, the harmonic detector 104 and the inverter controllers 106a, 106b can be integrated into the inverters 106a, 106b. The main controller 102 communicates with the inverter controllers 106a, 106b utilizing an AC power signal transmitted via the power bus 114. In addition, each inverter controller 106a, 106b can communicate with each other via the power bus 114.

In some implementations, the main controller 102 can collect system information from one or more of the inverters 108a, 108b, the AC load 112a, 112b, and the DC supply 110 (e.g., current, impedance, voltage measurements, power output, etc.). The system information can be received by the main controller 102 via the AC output of the inverters 108a, 108b and can be received via the supply bus 116. The information can be related to the output performance of the inverters 108a, 108b, the performance of the AC load 112a, 112b, the DC supply 110 performance, and/or the performance of the example system 100. The main controller 102 can collect the system information, process the system information, and generate operational instructions for the inverters based on the collected system information. Further, the operational instructions can direct the inverters 108a, 108b to perform various operations including: turn inverter power on, turn inverter power off, increase inverter voltage output, increase inverter current output, decrease inverter voltage output, decrease inverter current output, filter a predefined frequency from an inverter output signal, and so on.

In some implementations, the main controller 102 includes a processor that executes software implementing a filter for filtering out predefined harmonic components from an alternating current signal. The power signal transmitted by the main controller can include a communication signal that carries an operational signal via the power bus 114. In some implementations, the power signal can be the AC output of the inverters 108a, 108b and the same signal can be used as the power signal transmitted from the main controller 102 to the inverter controller 106a, 106b. The filter can be used to adjust frequencies embedded in the communication signal that is transmitted to the inverter controller 106a, 106b. The communication signal can include control data describing an operational instruction embedded into the communication signal.

The communication signal includes a fundamental frequency (e.g., 60 Hz, 120 Hz, etc.) that can be used to create and transmit the operational instruction. The filter can include a linear filter, e.g., a high pass filter with a cut-off frequency above the fundamental frequency, or a notch filter with a notch frequency at the fundamental frequency. The filter can be implemented as a digital filter or any suitable combination of digital filters. The main controller 104, using the filter, can extract or insert harmonic values into/from the communication signal before it is transmitted to the harmonic detector 104.

In some implementations, the communication signal includes harmonic components having one or more harmonic frequencies of the fundamental frequency. The main controller 102 can process the communication signal (e.g., the voltage and/or the current) to determine information about the harmonic components and the harmonic frequencies to transmit to the harmonic detector 104 and subsequently to the inverter controller 106a, 106b. Further, the main controller 102 injects or extracts harmonic frequencies from the communication signal such that the additional or subtracted frequencies have little or minimal impact on the example system 100.

For example, in a single phase system, even harmonics of the fundamental frequency for nonlinear loads can be used to send and/or receive communication signals over a power line. For balanced three-phased systems, multiples of the third harmonics can be used to send and/or receive information via the communication signal over a power line. Generally, the main controller 102 communicates using signals with low frequencies, but higher frequencies can be used. In some examples, the harmonic detector 104 receives the communication signal and processes information about the harmonic components and their relationship to the harmonic frequency.

In some implementations, the harmonic detector 104 can determine the fundamental frequency and the harmonic components present in the communication signal. For example, the harmonic detector 104 can determine the harmonic components to include one or more harmonic values (e.g., harmonic frequencies) of the fundamental frequency such as the second harmonic, the third harmonic, the fourth harmonic, and so on. Specifically, the harmonic detector can determine the specific harmonic number up to n-harmonics. Further, the harmonic detector 104 can determine the absence of one or more harmonic frequencies of the fundamental frequency.

In some implementations, the harmonic detector can transmit control data to the inverter controller 106a, 106b via the power bus 114. The control data can include information relating to which harmonic values are present and/or absent in the communication signal in the form of a bit representation. Subsequently, the inverter controller selects an operational instruction for the operation of the inverter as defined by the harmonic values present in the communication signal or according the bit pattern transmitted to the inverter controller 106a, 106b.

In some implementations, the bit pattern transmitted to the inverter controller 106a, 106b may include a binary representation of information characterized by the insertion or extraction of harmonic values. Accordingly, sending the operational instruction in the binary representation at predetermined time intervals is low bandwidth communication in smaller networks or distribution systems. The resulting signal has a low probability of interfering with the operation of the inverter 106a, 106b or other components within the system.

In some implementations, the bit pattern transmitted to the inverter controller 106a, 106b may include a binary representation of information characterized by the insertion or extraction of harmonic values. Accordingly, sending the operational instruction in the binary representation at predetermined time intervals is low bandwidth communication in smaller networks or distribution systems. Thus, ensuring a signal that does not interfere with the operation of the inverter 106a, 106b or other components within the system.

Figure 2:
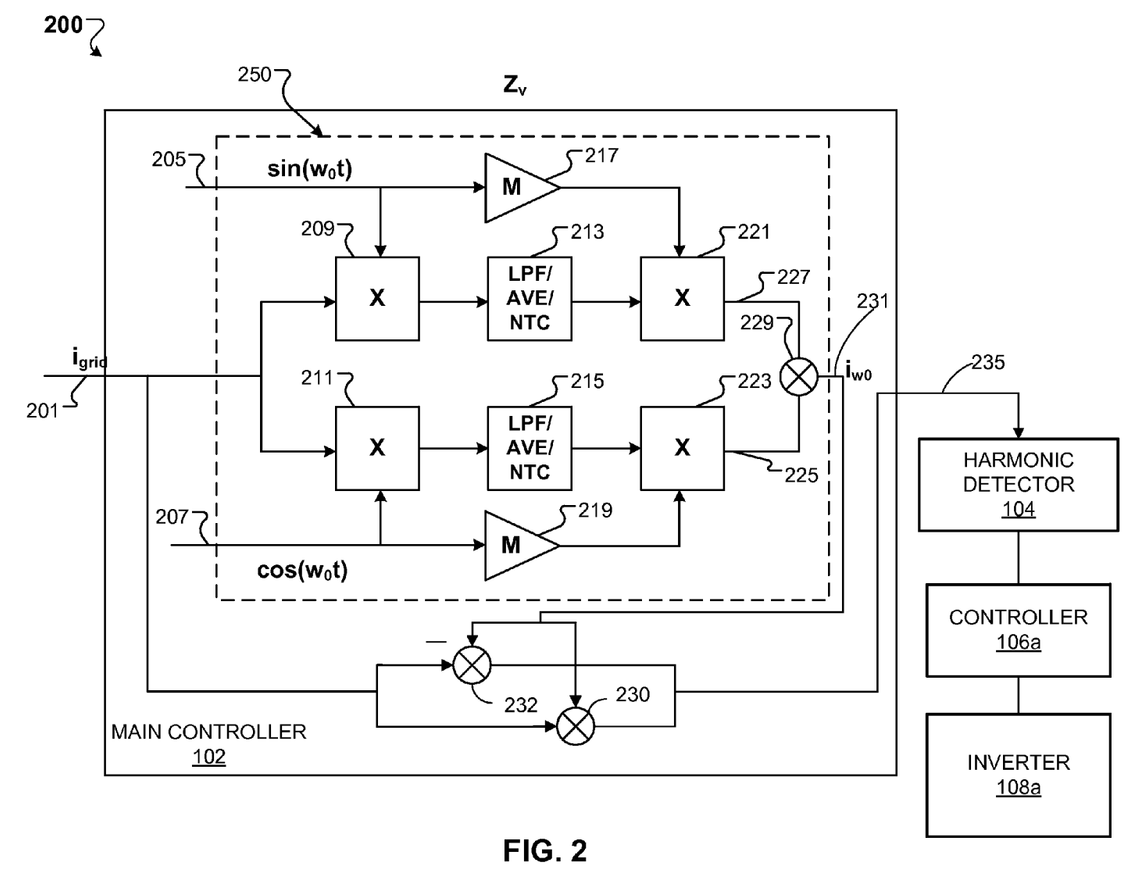
FIG. 2 is a block diagram of an example communication system illustrating an example harmonic value extraction and injection filter.

FIG. 2 is a block diagram of an example communication system 200 illustrating an example harmonic value extraction and injection filter that transmits a signal to a harmonic detector 104, an inverter controller 106a, and an inverter 108a. The harmonic detector 104, inverter 106a, and inverter 108a can be similar to the example components described in connection with FIG. 1.

The harmonic value extraction and injection filter 250 can be implemented as a stand-alone component or a component integral to the main controller 102 (as shown in FIG. 2). The harmonic value extraction and injection filter 250 enables the main controller to extract or inject harmonic values (e.g., harmonic frequencies) into a communication signal to send operational instructions to an inverter 108a, 108b. However, the harmonic value extraction and injection filter 250 can also be coupled to an inverter controller 106a, 106b (not shown in FIG. 2) such that two parallel inverters can communicate operational instructions to each other via a combination of extracted and injected harmonic values in a communication signal. Further, the harmonic value extraction and injection filter 250 can be implemented in a digital circuit, an analog circuit, or any combination of an analog or digital circuit.

The main controller 102 receives AC power from an external power source (not shown). For the purposes of illustrative discussion, the AC signal received by the main controller is determined to be a grid current $i_{grid}$ 201. The main controller 102 can determine a measurement of harmonic values; in particular, the main controller can determine a fundamental frequency $\omega_0$ and/or a harmonic frequency $\omega_n$ of the grid current $i_{grid}$ 201. The harmonic frequency $\omega_n$ is an integral multiple of the fundamental frequency $\omega_0$.

The main controller 102 can determine a desired operation intended for the inverter 108a based on information that is received in connection with the various components within the example system 100. Further, the main controller 102 can determine and select, based on identified harmonic values, control data that defines a relation between harmonic values, an operational instruction, and a desired operation for the inverter to perform. The main controller can insert or extract harmonic values via the harmonic value extraction and insertion filter 250 that creates the corresponding control data.

The harmonic value extracting and injecting filter 250 extracts current components for the communication signal 203. The harmonic value extracting and injecting filter can receive a sine and/or cosine signal 205, 207 that can include a sine wave signal $\sin(\omega_0 t)$ or a cosine wave signal $\cos(\omega_0 t)$ having the particular fundamental frequency $\omega_0$. This sine and/or cosine signal can be the same as $i_{grid}$ 201 or this can be a sine and/or cosine signal that is generated via a signal generator, frequency generator, an arbitrary waveform generator, or some other mechanism of the like external to the main controller 102 or embedded within the main controller.

The harmonic value extracting and injecting filter 250 receives the grid current 201, and at least one of the sine and/or cosine signals 205, 207 and performs a convolution operation using a multiplication component 209, 211. The convolution operation enables the sine wave 205 and the cosine wave 207 to become carrier signals for the grid current 201. The harmonic value extracting and injecting filter 250 filters the new combined signal (both the sine and/or cosine signal) with filtering components 213, 215. The filter component 213, 215 can include a low pass filter (LPF), an average operator (AVE), a notch filter (NTC), or a combination of filters. Also, the sine and/or cosine signal passes through an amplifier 217, 219 with a gain of M. In some implementations, the gain is chosen according to the design of the harmonic extracting and injecting filter 250 and the desired amplitude gain.

The harmonic value extracting and injecting filter 250 performs another convolution operation with a second pair of multiplication components 221, 223 involving the filtered sine and/or cosine signal and the amplified sine and/or cosine signal producing two modulated signals 225, 227. Subsequently, the harmonic value extracting and injecting filter 250 sums the two modulated signals 225, 227 with a summing component 229 to output a desired harmonic value $i_{w0}$ 231. The desired current component 231 can include any harmonic frequency of the fundamental frequency. The desired current component can include any desired phase shift or no phase shift.

The main controller 102 can inject or extract the desired current component 231 depending on the desired inverter operation. If the selected operational instruction (and subsequent control data) corresponding to the determined inverter operation is to contain an injected harmonic value, the desired current component 231 and the grid current 201 are passed through a summing component 230 and the output communication signal 235 is passed to the harmonic detector 104.

Alternatively, if the selected operational instruction (and analogous control data) corresponding to the determined in is to have a harmonic value extracted from the communication signal, the grid current 201 and the desired current component 231 pass through a subtracting component 232 and the communication signal 235 is passed to the harmonic detector 104 such that the control data can be transmitted to the inverter controller 106a to dictate to the inverter 108a the operational instruction corresponding to a desired inverter operation.

For example, in some implementations, if it is determined that the second harmonic of the fundamental frequency is to be injected into the communication signal 235. The second harmonic current component 231 would be extracted by the harmonic value extracting and injecting filter 250 and the grid current 201 and the second harmonic current component 231 pass through the summing component 230 and the output communication signal 235 has the second harmonic injected into the communication signal.

Alternatively, if the second harmonic is to be extracted from the communication signal 235, the grid current 201 and the second harmonic component 231 pass through the subtracting component 232. The resulting communication signal 231 has the second harmonic extracted from it.

Figure 3:
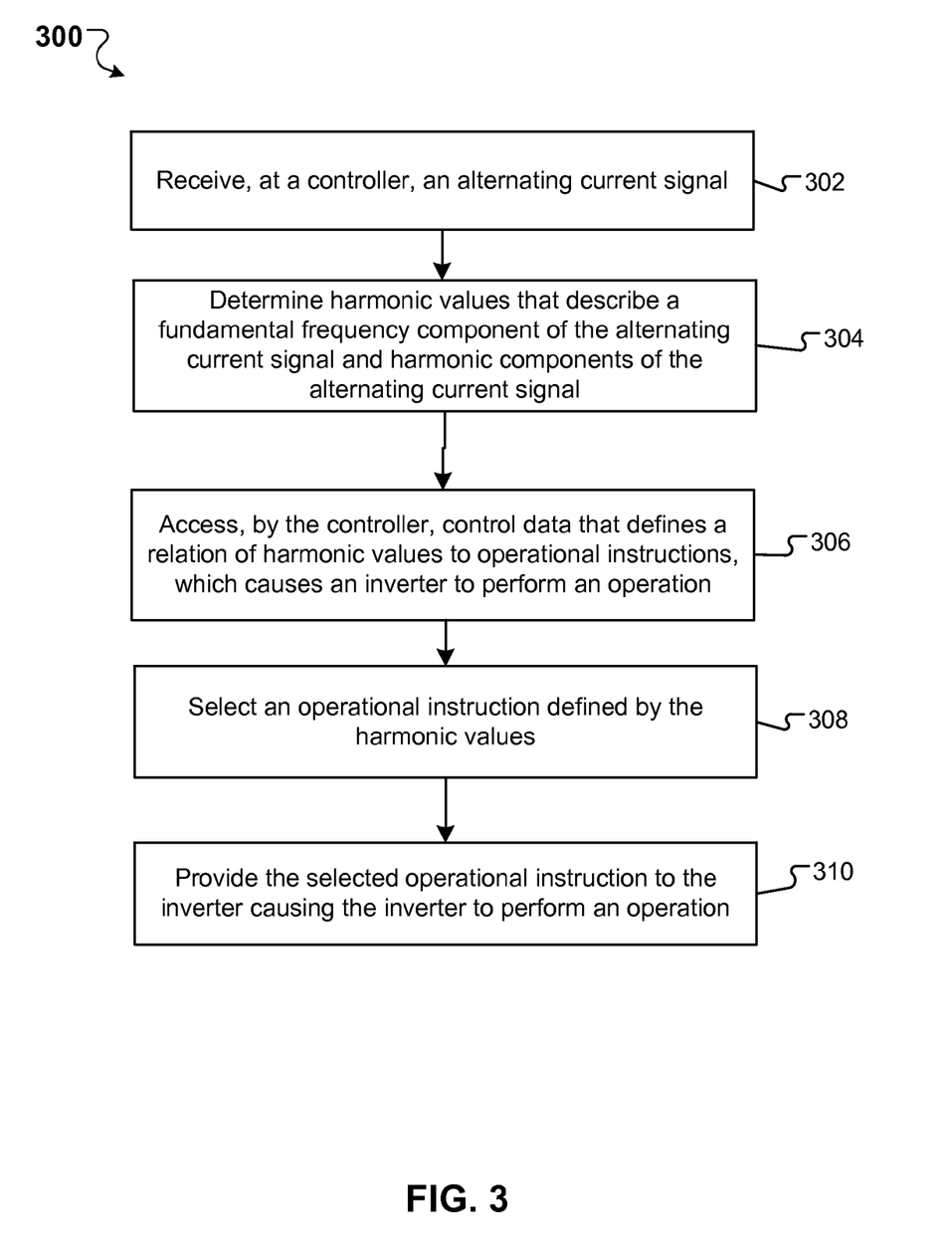
FIG. 3 is a flow diagram of an example process for determining an inverter operation according to components within an alternating current signal.

FIG. 3 is a flow diagram of an example process 300 for determining an inverter operation according to harmonic components and harmonic values within an alternating current power signal. The inverter can be similar to the inverters 108a, 108b in the example system 100 illustrated in FIG. 1. The main controller 102 transmits a communication signal with an embedded operational instruction to an inverter controller 106a, 106b to dictate to the inverter 108a, 108b to perform an inverter operation. The main controller 102 can be similar to the main controller in FIGS. 1 and 2, the main controller 102 including the harmonic value extracting and injecting filter 250 of FIG. 2, and the inverter controller 106a, 106b can be similar to the inverter controller in FIGS. 1 and 2. Further, a harmonic detector 104 similar to the harmonic detector in FIGS. 1 and 2 detects the harmonic values within the communication signal.

In some implementations, the main controller 102 can receive information about the example system 100 such as voltages, currents, impedances, and so on for each of the various components of the example system (e.g., the DC supply 110, the inverter 108a, 108b, the AC load 112a, 112b, etc.). For example, the main controller 102 may determine that the AC load 112a, 112b has caused a voltage sag on the inverter output voltage and that the inverter needs to increase the output voltage. The main controller may send an intermittent communication signal to raise the inverter output voltage. The main controller can determine a combination of the presence or absence of harmonic values that corresponds to the operational function of raising the inverter output voltage. Various combinations of the presence or absence of harmonic values correspond to different operational instructions. For example, the presence of only the second harmonic may represent lower the inverter output current.

Generally, each operational instruction has a corresponding combination of harmonic frequencies to be injected or extracted from the communication signal. In some implementations, the main controller 102 can include a command table or chart that correlates operational instructions to a particular combination of extracted or injected harmonic frequencies. Also, each different inverter in a network of parallel inverters can have its own corresponding sets of control data, such that one main controller 102 can send the same signal to a group of inverters, but one inverter is operatively configured to understand a particular combination of harmonic values. In other words, the main controller can send a command to more than one inverter and control each inverter individually according to the particular combination of harmonic values present in the communication signal.

The inverter controller 106a, 106b receives an alternating current signal from the main controller 102. The alternating current signal is a power signal that can include a communication signal. The alternating current signal includes a fundamental frequency and harmonic values that were injected by the harmonic value extracting and injecting filter 250 within the main controller 102. The main controller 102 can determine the fundamental frequency of an incoming alternating current signal and subsequently n levels of harmonic frequencies of the incoming alternating current signal.

Upon receiving the alternating current signal, the inverter controller 106a, 106b determines the harmonic values that describe the fundamental frequency of the alternating current signal and the harmonic components of the alternating current signal (304). The inverter controller 106a, 106b accesses control data that defines a relation of harmonic values to corresponding operational instructions (306). As previously described, the operational instruction causes the inverter 108a, 108b to perform an operation that is defined by the operational instruction. The inverter controller 106a, 106b selects an operational instruction from the operational instructions (308) that is defined by the harmonic values absent or present from/in the communication signal using the control data that defines the relation of harmonic values to operational instructions. Subsequently, the inverter controller provides the selected operational instruction to the inverter to cause the inverter to perform the operation defined by the selected operational instruction (310).

Figure 4:
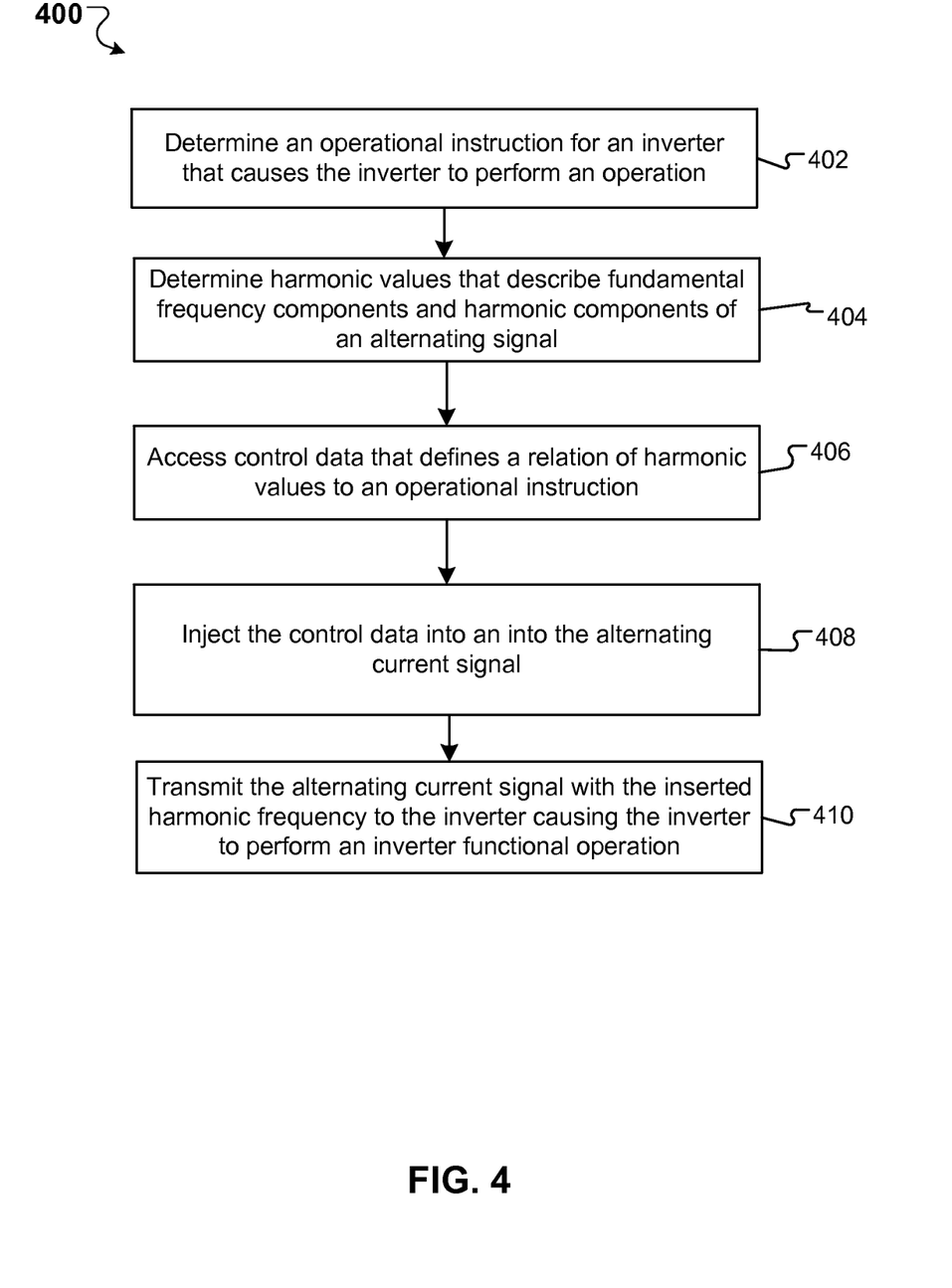
FIG. 4 is a flow diagram of an example process for inserting or extracting a harmonic frequency into an alternating current signal.

FIG. 4 is a flow diagram of an example process 400 for inserting or extracting a harmonic frequency into an alternating current signal. Similar to the discussion in connection with FIG. 3, components in connection with the FIG. 4 discussion can be similar to those found in FIGS. 1 and 2. As previously described, the main controller 102 can receive information about the example system, which provides the main controller 102 with various system status information. Further, according to the system status information, the main controller 102 can determine an operational instruction intended for delivery to an inverter 108a, 108b, wherein the operational instruction causes the inverter to perform an operation chosen from at least one of a plurality of inverter functional operations (402).

The main controller 102 determines harmonic values that describe a fundamental frequency component of an alternating current signal and harmonic components of the alternating current signal (404). The harmonic components of the alternating current signal can include various harmonic frequencies of the fundamental frequency.

The main controller 102 selects control data that defines a relation of the harmonic values to the determined operational instruction (406). The control data can include the absence or the presence of various harmonic frequencies that are to be extracted or injected into the communication signal.

Generally, a particular combination of injected or extracted harmonic frequencies into the communication signal corresponds to a particular operational instruction for the inverter 108a, 108b to perform. Further, the operational instruction corresponds to a particular inverter operation.

After the main controller determines the control data for the desired operational instruction, the control data is injected into the alternating current signal that corresponds to an operational instruction for the inverter (408). The alternating current signal with the inserted control data is transmitted to the inverter causing the inverter to perform at least one of the plurality of inverter functional operations (410).

In some implementations, the inverter controller 106a, 106b injects or extracts harmonic signals in the output signal of the inverter into a distribution grid. The extracted or injected harmonic signals may represent operational instructions and/or information intended for delivery to the components within the distribution grid. For example, an AC load 112a, 112b receives the inverter output with the injected or extracted harmonic signals and interprets the output signal according to a predefined protocol. The predefined protocol enables the AC load to interpret the output signal as an operational instructions, relayed information, or any other means of the like.

According to these implementations, each component within the distribution grid (AC load 112a, 112b, inverters 108a, 108b, DC supply 110, etc.) has a dedicated harmonic value extracting and injecting filter 250 and harmonic detector 104. Each component having their own dedicated harmonic value extracting and injecting filter 250 and harmonic detector 104 enables each component to communicate with the other components within the distribution grid. Further, this can also enable communication with the components on the distribution grid and a central coordinating authority. The central coordinating authority may be able to relay information sent across the distribution grid and other components that are not local and not part of the power generation components or the distribution grid.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be computer-readable medium, such as a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

In some implementations, the inverter controller 106a, 106b injects and/or extracts harmonic signals into the output signal of the inverter and subsequently, out onto the distribution grid. The extracted or injected harmonic signals may represent operational instructions and/or information destined for various components within the distribution grid. For example, an AC load 112a, 112b receives the inverter output with the injected and/or extracted harmonic signals and interprets the output signal according to a predefined protocol. The predefined protocol enables the AC load to interpret the output signal as operational instructions, relayed information, or any other means of the like.

In some of these implementations, each component within the distribution grid (AC load 112a, 112b, inverters 108a, 108b, DC supply 110, etc.) has a distinct and dedicated harmonic value extracting and injecting filter 250 and harmonic detector 104. By including a dedicated harmonic value extracting and injecting filter 250 and harmonic detector 104 in each component, each component can communicate with the other components within the distribution grid. Further, those components can communicate with the components on the distribution grid and a central coordinating authority. The central coordinating authority may be able to relay information sent across the distribution grid and other components that are not local and not part of the power generation components or the distribution grid.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A method, comprising:
   receiving, at a controller, an alternating current signal;
   determining harmonic values that describe a fundamental frequency component of the alternating current signal and harmonic components of the alternating current signal;
   accessing, by the controller, control data that defines a relation of harmonic values to operational instructions, wherein each operational instruction, when supplied to an inverter, causes the inverter to perform an operation defined by the operational instruction;
   selecting, by the controller, an operational instruction from the operational instructions, the selected operational instruction based on the determined harmonic values and the control data; and
   providing, by the controller, the selected operational instruction to the inverter to cause the inverter to perform the operation defined by the selected operational instruction.

2. The method of claim 1, wherein the harmonic component comprises a harmonic frequency of the fundamental frequency component of the alternating current signal.

3. The method of claim 1, comprising, after accessing the control data, extracting an injected harmonic component from the alternating current signal.

4. The method of claim 1, wherein the operational instruction, when supplied to the inverter, causes the inverter to perform one or more of the following actions: turn inverter power on, turn inverter power off, increase inverter voltage output, increase inverter current output, decrease inverter voltage output, decrease inverter current output, and filter a predefined frequency from an inverter output signal.

5. A method, comprising:
   determining, by a main controller, an operational instruction for an inverter, wherein the operational instruction, when supplied to the inverter, causes the inverter to perform an operation chosen from at least one of a plurality of inverter functional operations;
   determining, by the main controller, harmonic values that describe a fundamental frequency component of an alternating current signal and harmonic components of the alternating current signal;
   accessing, by the main controller, control data that defines a relation of the harmonic values of the alternating current signal to the determined operational instruction;
   injecting, by the main controller, the control data into the alternating current signal that corresponds to the determined operational instruction for the inverter, wherein the control data comprises harmonic values selected to define the operational instruction for the inverter; and
   transmitting, by the main controller, the alternating current signal with the injected control data to the inverter causing the inverter to perform, based on the injected control data, at least one of the plurality of inverter functional operations.

6. The method of claim 5, wherein the alternating current signal comprises a power signal received from an inverter output signal.

7. The method of claim 5, comprising, prior to transmitting by the main controller, the alternating current signal, extracting the control data from the alternating current signal that corresponds to the determined operational instruction for the inverter, wherein the control data comprises harmonic values selected to define the operational instruction for the inverter.

8. The method of claim 5, further comprising receiving a set of status information related to performance of at least one system component, wherein determining, by the main controller, the operational instruction for an instruction is based off of the set of system information.

9. The method of claim 5, wherein each of the harmonic components comprise at least one harmonic frequency of the fundamental frequency component of the alternating current signal.

10. The method of claim 5, wherein providing the selected operational instruction to the inverter includes one or more of the following: turn inverter power on, turn inverter power off, increase inverter voltage output, increase inverter current output, decrease inverter voltage output, decrease inverter current output, and filter a predefined frequency from an inverter output signal.

11. A system, comprising:
an inverter, a main controller, and an inverter controller coupled to the inverter and the main controller, the inverter controller operatively configured to perform operations comprising:
receive an alternating current signal;
determine harmonic values that describe a fundamental frequency component of the alternating current signal and harmonic components of the alternating current signal;
access control data that defines a relation of harmonic values to operational instructions, wherein each operational instruction, when supplied to an inverter, causes the inverter to perform an operation defined by the operational instruction;
select an operational instruction from the operational instructions, the selected operational instruction based on the determined harmonic values and the control data; and
provide the selected operational instruction to the inverter to cause the inverter to perform the operation defined by the selected operational instruction.

12. The system of claim 11, wherein the harmonic components comprise a harmonic frequency of the fundamental frequency component of the alternating current signal.

13. The system of claim 11, comprising, prior to receiving, at the inverter controller, the alternating current, extracting, by the main controller, a harmonic component from the alternating current signal.

14. The system of claim 11, comprising, prior to receiving, at the inverter controller, the alternating current signal, injecting a harmonic component into the alternating current signal.

15. The system of claim 14, further comprising, after accessing by the inverter controller, control data, extracting the injected harmonic component from the alternating current signal.

16. The system of claim 11, wherein the operational instruction, when provided to the inverter, causes the inverter to perform one or more of the following actions: turn inverter power on, turn inverter power off, increase inverter voltage output, increase inverter current output, decrease inverter voltage output, decrease inverter current output, and filter a predefined frequency from an inverter output signal.

17. The system of claim 11, wherein the alternating current signal is transmitted from the main controller to the inverter controller over a power bus.

18. The system of claim 11, wherein the main controller is operatively configured to:
determine the operational instruction for the inverter, wherein the operational instruction, when supplied to the inverter, causes the inverter to perform an operation chosen from at least one of a plurality of inverter functional operations;
access control data that defines the relation of the harmonic values and harmonic components of the alternating current signal to the determined operational instruction;
inject the control data into the alternating current signal that corresponds to the determined operational instruction for the inverter, wherein the control data comprises harmonic values selected to define the operational instruction for the inverter; and
transmit the alternating current signal with the injected control data to the inverter causing the inverter to perform, based on the injected control data, at least one of the plurality of inverter functional operations.

19. The system of claim 18, wherein the main controller is further operatively configured to receive a set of status information from at least one of an AC load, a DC supply, the inverter, and the inverter controller to determine the operational instruction for the inverter based on the set of status information.

20. The system of claim 11, wherein the inverter is operatively configured to receive the selected operational instruction to cause the inverter to perform the operation defined by the selected operational instruction.

* * * * *